United States Patent
Wang et al.

(10) Patent No.: US 8,532,800 B2
(45) Date of Patent: Sep. 10, 2013

(54) UNIFORM PROGRAM INDEXING METHOD WITH SIMPLE AND ROBUST AUDIO FEATURE ENHANCING METHODS

(75) Inventors: Bei Wang, Jiangsu (CN); Chia-Hung Yeh, Tai-Nan (TW); Hsuan-Huei Shih, Taipei (TW); Chung-Chieh Kuo, Taipei (TW)

(73) Assignee: MAVs Lab. Inc., Songshan Dist., Taipei (TW)

( * ) Notice: Subject to any disclaimer, the term of this patent is extended or adjusted under 35 U.S.C. 154(b) by 1874 days.

(21) Appl. No.: 11/752,932

(22) Filed: May 24, 2007

(65) Prior Publication Data

US 2008/0292273 A1    Nov. 27, 2008

(51) Int. Cl.
G06F 17/00    (2006.01)
H04N 9/80    (2006.01)
G10L 17/00    (2013.01)

(52) U.S. Cl.
USPC .............................. 700/94; 386/251; 704/247

(58) Field of Classification Search
USPC ............................ 700/94; 386/251; 704/247
See application file for complete search history.

(56) References Cited

U.S. PATENT DOCUMENTS 6,691,090 B1 *    2/2004    Laurila et al. ................. 704/250
7,028,325 B1 *    4/2006    Rui et al. ........................ 725/37
2003/0063798 A1 *    4/2003    Li et al. .......................... 382/165
2007/0033229 A1    2/2007    Fassett et al.
2007/0242926 A1 *    10/2007    Huang et al. ..................... 386/52

FOREIGN PATENT DOCUMENTS

| JP | 2004326404 | 11/2004 |
| TW | 1220483 | 8/2004 |
| TW | 200709600 | 3/2007 |

* cited by examiner

Primary Examiner — Davetta W Goins
Assistant Examiner — Daniel Sellers
(74) Attorney, Agent, or Firm — Winston Hsu; Scott Margo

(57) ABSTRACT

Simple, computational efficient, and robust audio features are applied in a uniform program indexing method for picking up video segments relating to highlight plays in a recorded program worthy of being reviewed. By focusing on certain frequencies in an audio sequence of the program, a computational complexity of the uniform program indexing method is significantly decreased. With the aid of MFCC coefficients and a DFBE coefficient generated from the MFCC coefficients, audio patterns may be utilized for differentiating exciting events in the program from other unnecessary information. Scores corresponding to various audio segments are regarded as standards for picking up video segments in the program worthy of being chosen in a recorded highlight collection. Some low-level-feature parameters, some video segments having highlight-related visual characteristics, and a re-ranking procedure are utilized for enhancing precision of the scores for providing video segments worthy of being reviewed.

17 Claims, 8 Drawing Sheets

UNIFORM PROGRAM INDEXING METHOD WITH SIMPLE AND ROBUST AUDIO FEATURE ENHANCING METHODS

BACKGROUND OF THE INVENTION

1. Field of the Invention

The present invention relates to a uniform program indexing method and related enhancing methods, and more particularly, to a uniform program indexing method with a simple and robust audio feature and related enhancing methods.

2. Description of the Prior Art

In popular sports like soccer, baseball, basketball, American football, and golf, related broadcasted programs are required to satisfy various viewing properties of audiences. All of the above mentioned sports games are programs requiring highlights. However, a regular and complete live game is pretty long, for example, at least 2 hours. Game length is partially because of commercial advertisements inserted into the game, and because of an abundant plurality of various plays stuffed in the game. Audiences are often merely interested in beautiful scenes, turning points, and some special events including fouls, scorings, effective or defended plays, critical plays in a sudden death, injury delays, accidental fights between players, critical player changes, and ambiguous judgments by referees, instead of commercial advertisements and commonplace events of the game after recording the whole game. Therefore, audiences may want to merely pick the beautiful scenes, the turning points, and the special events up from the recorded game automatically, and such game highlights are thus an attractive multimedia application for the audiences.

SUMMARY OF THE INVENTION

The claimed invention provides a uniform program indexing method with a simple and robust audio feature. The method comprises detecting commercial advertisements in a received audio sequence of a program, where the received audio sequence includes a plurality of audio frames. The detected commercial advertisements are removed from the received audio sequence. The audio sequence where the detected commercial advertisements have been removed is then sampled with a specific frequency. A plurality of Mel Frequency Cepstral Coefficients (MFCC) is generated for each audio frame of the modified audio sequence. Normalized coefficients are retrieved from the generated plurality of Mel Frequency Cepstral Coefficients of each of the audio frame. A dominant frequency band energy coefficient is then generated from retrieved coefficients C2 and C3 out of the retrieved normalized coefficients for each of the audio frame. A plurality of peak patterns is generated from a plurality of dominant frequency band energy coefficients in the modified audio sequence with a low-pass filter, where a peak pattern comprises a plurality of consecutive audio frames of the received audio sequence. A threshold for transforming the plurality of peak patterns into a first plurality of audio segments is determined, where each of the first plurality of audio segments has more audio frames than a corresponding peak pattern has. Finally, a score for each of the first plurality of audio segments is generated according to a dominant frequency band energy coefficient generated from processed audio segment and a related weight.

The claimed invention provides an enhancing method of supporting uniform program indexing with a plurality of low-level features. The enhancing method comprises generating a first low-level-feature parameter for each of a first plurality of audio segments having a plurality of audio frames according to an equation $$v(n) = \sqrt{\frac{1}{N} \sum_{i=0}^{N-1} S_n^2(i)},$$

where $v(n)$ indicates the first low-level-feature parameter of an n-th audio segment of the first plurality of audio segments, $S_n(i)$ indicates an energy of an i-th audio frame of the n-th audio segment, and N indicates a total number of audio frames in the n-th audio segment. A second low-level-feature parameter for each of the first plurality of audio segments is generated according to a standard deviation of energies of the audio frames of each of the first plurality of audio segments. A third low-level-feature parameter for the first plurality of audio segments is generated according to each of the generated first low-level-feature parameters and to an equation $$EDR = \frac{\text{Max}(v) - \text{Min}(v)}{\text{Max}(v)},$$

where EDR indicates the third low-level-feature parameter, $\text{Max}(v)$ indicates a maximum among all the generated first low-level feature parameters, and $\text{Min}(v)$ indicates a minimum among all the generated first low-level-feature parameters. A fourth low-level-feature parameter for each of the first plurality of audio segments is generated according to an equation $$z(n) = \frac{1}{2} \sum |\text{sgn}(S(m)) - \text{sgn}(S(m-1))| w(n-m),$$

where $z(n)$ indicates the fourth low-level-feature parameter of an n-th audio segment of the first plurality of audio segments, $S(m)$ indicates an energy of a m-th audio frame of said n-th audio segment, $\text{sgn}(S(m))$ indicates a sign of the energy $S(m)$ so that $$\text{sgn}(S(m)) = \begin{cases} 1 & \text{if } S(m) \geq 0 \\ -1 & \text{if } S(m) < 0 \end{cases},$$

and $w(n-m)$ indicates a window size of the m-th audio frame. A score is then generated with an equation $$\text{Score} = w_0 * DFBE + \sum_{i=1}^{4} w_i * LLF_i,$$

where Score indicates the generated score, DFBE indicates a dominant frequency band energy coefficient of a audio segment, $w_0$ indicates the weight of the dominant frequency band energy coefficient DFBE, $LLF_i$ indicates an abovementioned i-th low-level-feature parameter, and $w_i$ with i ranging from 1 to 4 indicates a weight of the i-th low-level-feature parameter.

The claimed invention provides an enhancing method of supporting uniform program indexing with a dominant frequency band energy weight. The enhancing method comprises generating a plurality of Mel Frequency Cepstral Coefficients (MFCC) for each audio frame of an audio sequence of a program and retrieving coefficients C2 and C3 from the generated plurality of Mel Frequency Cepstral Coefficients of each said audio frame. A dominant frequency band energy coefficient is generated from the retrieved coefficients C2 and C3 for each said audio frame by following an equation DFBE=4*C2+C3, where DFBE indicates the generated dominant frequency band energy coefficient.

The claimed invention also provides an enhancing method of supporting uniform program indexing with specific video feature. The enhancing method comprises retrieving a first plurality of video segments of a video sequence of a program, which has an audio sequence comprising a first plurality of audio segments, according to scores of a second plurality of audio segments generated from the first plurality of audio segments, determining a characteristic scene and a dominant color according to a type of the program, classifying the first plurality of video segments into a first gray image region and a second gray image region, where the first gray image region is dominated by the determined dominant color whereas the second gray image region is not, generating a second plurality video segments by filtering off the second gray image region from the first plurality of video segments, removing isolated characteristic spots from the second plurality of video segments, and performing an edge detection on the second plurality of video segments for detecting whether the characteristic scene exists in the second plurality of video segments.

These and other objectives of the present invention will no doubt become obvious to those of ordinary skill in the art after reading the following detailed description of the preferred embodiment that is illustrated in the various figures and drawings.

DETAILED DESCRIPTION

A uniform program indexing method with a simple and robust audio feature is provided in the present invention along with some other related enhancing methods for supporting the uniform program indexing method. The uniform program indexing method may help audiences merely watch highlights by simply searching characteristic patterns indicating the highlights of a game they watched. The searched characteristic patterns mostly rely on audio information of the program since analyzing video information takes large efforts and a significantly higher complexity, though the uniform program indexing method may ensure a better satisfying highlight collection with some enhancing methods also, where the enhancing methods rely on both audio and video information of the program.

Figure 1:
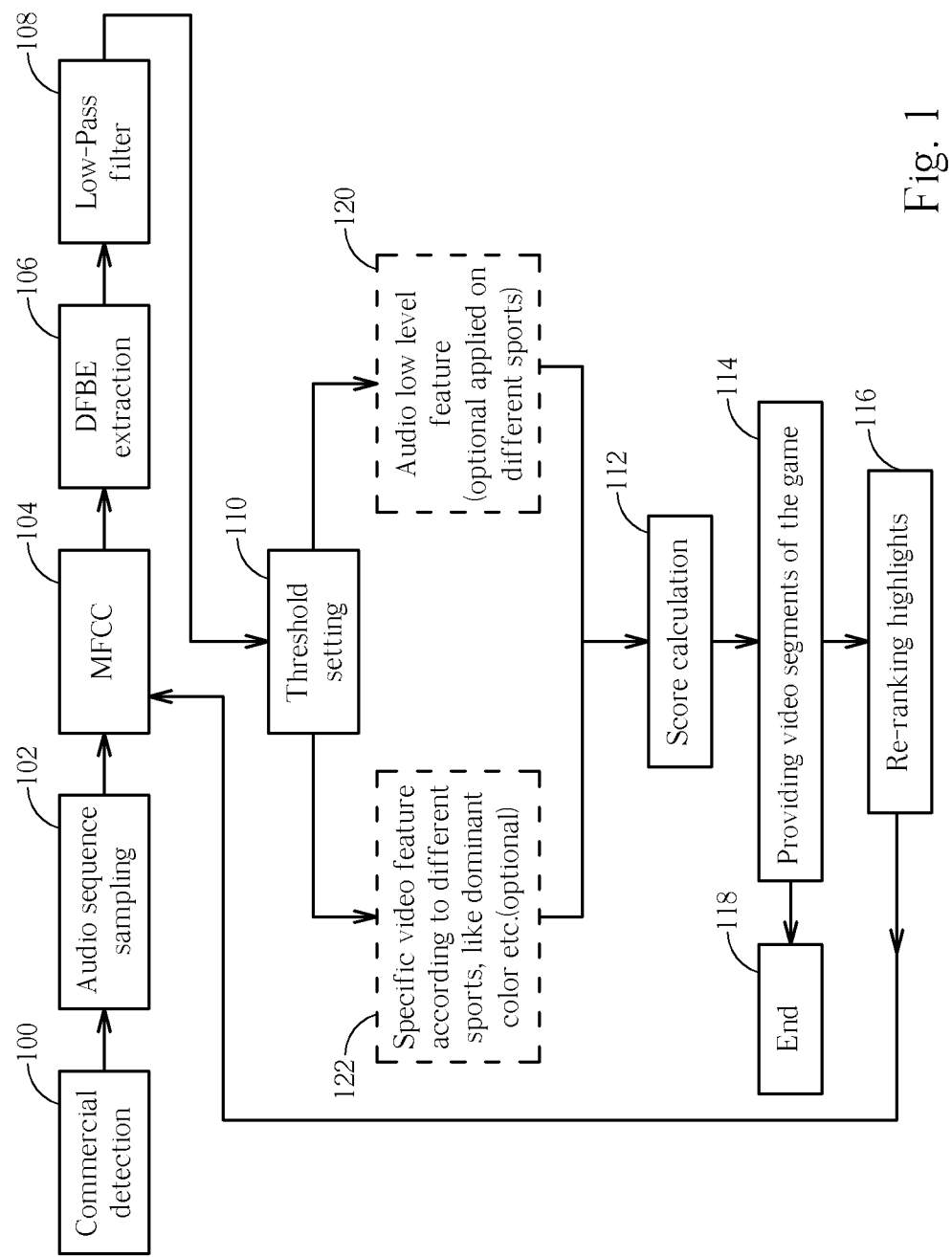
FIG. 1 is a flowchart illustrating steps of a uniform program indexing method along with a plurality of enhancing methods for supporting the uniform program indexing method in the present invention.

Please refer to FIG. 1, which is a flowchart illustrating steps of the uniform program indexing method along with the plurality of enhancing methods for supporting the uniform program indexing method in the present invention. The above-mentioned methods of the present invention are summarized as follows:

Step 100: Perform commercial detection on an audio sequence of a program, where the audio sequence includes a plurality of audio frames.

Step 102: Sample the audio sequence with a specific frequency.

Step 104: Generate a plurality of Mel Frequency Cepstral Coefficients (MFCC) for each audio frame of the received audio sequence.

Step 106: Generate a dominant frequency band energy coefficient (DFBE) from generated Mel Frequency Cepstral Coefficients C2 and C3 for each said audio frame.

Step 108: Generate a plurality of peak patterns from a plurality of dominant frequency band energy coefficients in the received audio sequence with a low-pass filter, where a peak pattern comprises a plurality of consecutive audio frames of the received audio sequence.

Step 110: Determine a threshold for transforming the plurality of peak patterns into a first plurality of audio segments.

Step 112: Generate a score for each of the first plurality of audio segments according to a dominant frequency band energy coefficient generated from said each audio segment and a related weight.

Step 114: Providing video segments of the game according to the generated scores of corresponding audio segments in the first plurality of audio segments.

Step 116: Merge some of the first plurality of audio segments into a second plurality of audio segments, discard some of the first plurality of audio segments according to a segmentation rule, and then optionally go to Step 104.

In the uniform program indexing method of the present invention, a program, which may be a sporting activity, includes multimedia information such as an audio sequence and a video sequence, where said audio sequence includes a plurality of audio frames. The above-listed steps are primarily performed on the audio sequence, and by filtering off redundant information in said audio sequence, a plurality of audio segments is generated, where one audio segment is combined with a plurality of audio frames. At last, a plurality of video segments is retrieved from the video sequence according to the generated plurality of audio segments for retrieving required highlights of the activity.

As mentioned above, commercial advertisements may be considered boring for an audience recording a sports game program while reviewing the recorded game. Therefore, in step 100, commercial advertisements are first detected in the video sequence according to some specific features in said commercial advertisements, and are then removed from the audio sequence.

In step 102, the audio sequence processed in step 100 is sampled with a specific frequency. In a preferred embodiment of the present invention relating to a regular soccer game, a frequency of 8 KHz is sampled on the audio sequence during a recorded soccer game since 8 KHz indicates a frequency of ordinary human voices. Most of the time, in such a regular soccer game, commentators give plain comments about what goes on in the field, and audiences are relatively calm except for some spontaneous cheering or singing. However, when a desired event for the audiences happens, commentators get excited about the desired event, and the audiences tend to cheer for the desired event. There are certain audio features for such events in a frequency domain of the audio sequence, and moreover, a degree of cheers corresponds to how excellent a goal or an effective shot is. Therefore, the audio features are utilized in step 102.

According to certain experimental data, when a highlight in the soccer game happens, there is a very strong audio band energy twice the band energy of a fundamental frequency of the commentators' speech, where the frequency of said strong audio band energy is 8 KHz. Duration of the strong audio band energy is also longer than other speech components when there are no critical plays. Audience's cheers are also strong for a wide range of frequencies. According to the abovementioned reasons, it is beneficial to gather audio band energy at 8 KHz for meeting critical plays in the audio sequence, and 8 KHz is thus the value of the specific frequency in the preferred embodiment relating to the soccer game. Note that for various programs, the value of the specific frequency may be different also, and it depends on what audio features are dominant for meeting requirements of audiences. Moreover, merely sampling the audio sequence according to the specific frequency significantly decreases the computational complexity of the uniform program indexing method.

In step 104, for preventing disturbances of the pure sound source from affecting tracing highlight sound patterns, a well-known feature denoted as Mel Frequency Cepstral Coefficients (MFCC) is utilized for representing audio signals through different band filters. The MFCC coefficients include coefficients C0, C1, C2, ..., C11, and C12. For indicating various types of energy, all the listed coefficients except C0 are normalized by the coefficient C0 under certain circumstances since the coefficient C0 is a function of power in audio signals. According to experimental results from testing the coefficients C0, C1, C2, ..., C11, and C12 under the abovementioned preferred embodiment relating to the soccer game in the present invention, and under the specific frequency of 8 KHz, it is found that the coefficients C2 and C3 are dominant among all the MFCC coefficients for indicating exciting events in a program such as the soccer game, where the coefficient C2 is a better indicator than the coefficient C3. Therefore in step 106, both of the coefficients C2 and C3 are utilized for defining a more precise audio feature for indicating the exciting events of a program, where said precise audio feature is denoted as a dominant frequency band energy (DFBE) coefficient and is defined by:

$$DFBE=4*C2+C3 \quad (1)$$

where a weight 4 of the coefficient C2 is larger than a weight 1 of the coefficient C3 is based on the fact that the coefficient C2 is a better indicator than the coefficient C3.

Figure 2:
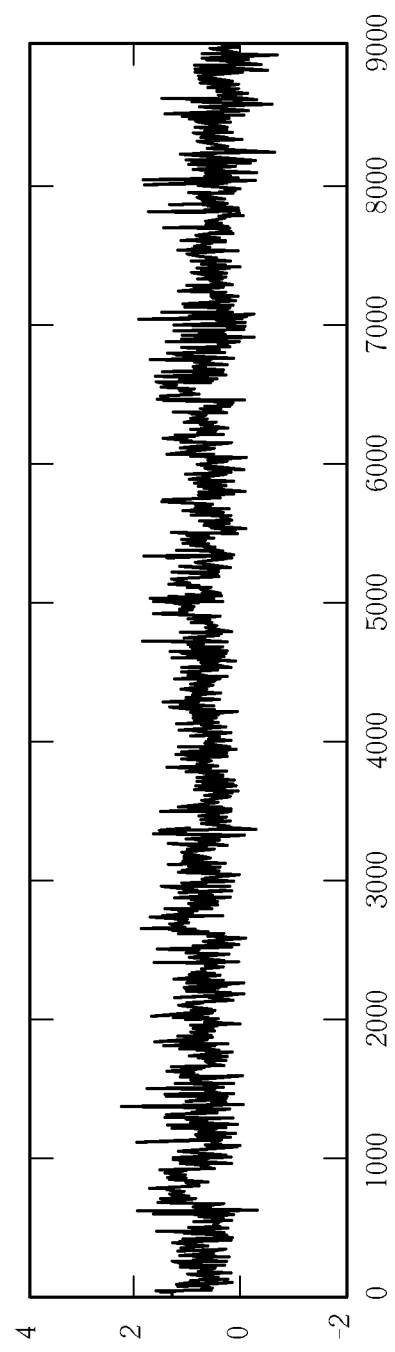
FIG. 2 illustrates an experimental plot for indicating a relationship between DFBE coefficients of various audio frames in the audio sequence according to a preferred embodiment of the present invention.

Please refer to FIG. 2, which illustrates an experimental plot for indicating a relationship between DFBE coefficients of various audio frames in the audio sequence according to a preferred embodiment of the present invention. In FIG. 2, the horizontal axis indicates time under units of audio frames, where each audio frame of the audio sequence equals to 100 milliseconds, and moreover, the vertical axis indicates values of DFBE coefficients. As seen from FIG. 2, the DFBE coefficients of various audio frames are illustrated, though the plot in FIG. 2 is obviously affected by noises, and does not give beneficial information about exciting events. Therefore in step 108, a low pass filter is utilized for filtering off the noises affecting the plot shown in FIG. 2.

Figure 3:
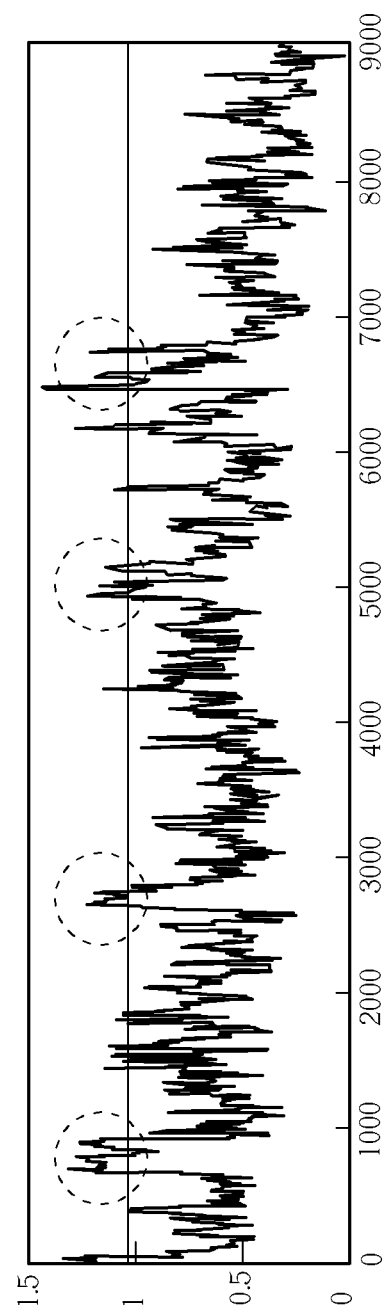
FIG. 3 illustrates a plot generated by filtering out noises from the plot shown in FIG. 2 with a low pass filter.

Please refer to FIG. 3, which illustrates a plot generated by filtering out noises from the plot shown in FIG. 2 with the low pass filter. As seen in FIG. 3, a rough first threshold indicated by a black line is temporarily set for indicating a plurality of peak patterns separated from each other, where said plurality of peak patterns is utilized for indicating possible highlight plays respectively. Therefore, there are four tiny peak patterns, which indicate small DFBE coefficients respectively, above the set first threshold in FIG. 3.

Since the indicated peak patterns shown in FIG. 3 are neither high enough nor long enough in duration, the first threshold shown in FIG. 3 has to be adjusted for emphasizing said peak patterns. After adjusting the first threshold, the peak patterns shown in FIG. 3 are transformed into a corresponding plurality of audio segments, each of which includes more audio frames than a corresponding peak pattern has for indicating a longer duration. In step 110, the first threshold is transformed into a second threshold according to an equation:

$$Thresh=mean+x*std \quad (2);$$

where Thresh indicates the second threshold, mean indicates a mean of the plurality of DFBE coefficients illustrated in FIG. 3, std indicates a standard deviation of said plurality of DFBE coefficients, and x is a variable. Note that the second threshold generated according to the equation (2) should not be limitations for the present invention, and moreover, in a preferred embodiment of the present invention, the value of the variable is 1.

Figure 4:
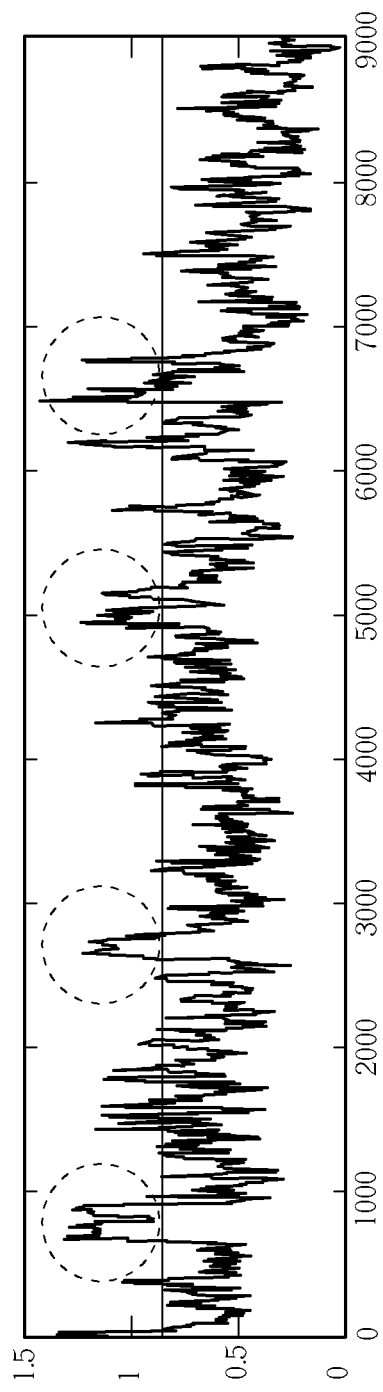
FIG. 4 illustrates a plot utilizing the second threshold with respect to the plot shown in FIG. 3.

Please refer to FIG. 4, which illustrates a plot utilizing the second threshold with respect to the plot shown in FIG. 3. As shown in FIG. 4, the previously illustrated peak patterns are more clearly illustrated in FIG. 4 in forms of audio segments having longer durations and emphasized DFBE coefficients. The aim of retrieving a longer duration in an audio segment lies in the fact that the audio segment is not too short to record a complete story of an exciting event, since the exciting event is always held a few seconds before both audiences and commentators yell.

In step 112, a score is calculated for each audio segments generated in step 110 for determining which audio segments are worthy of being collected as highlights. In a preferred embodiment of the present invention, a higher score indicates a corresponding audio segment has a higher probability to indicate an exciting event, though the way of choosing segments having higher scores should not be limitations to the present invention. The calculated score is primarily depending on a standard DFBE coefficient of the audio segment, where the standard DFBE coefficient may be an average value among all the DFBE coefficients of audio frames in said audio segment. Therefore, the score may be calculated as:

$$Score=w_0*DFBE \quad (3);$$

where Score indicates the calculated score, DFBE indicates a dominant frequency band energy coefficient of an audio segment, $w_0$ indicates the weight of the DFBE coefficient DFBE. When derived video segments according to the calculated scores of chosen audio segments are satisfying so that could be confirmed, it may lead to step 118 ending the process according to the present invention. However, there are also some enhancing methods for adjusting scores so that related video segments of more exciting events may be determined, where said enhancing methods are listed in steps 120 and 122. Moreover, when derived video segments are not satisfying enough, the abovementioned steps from 104 to 112 may be executed again for generating more precise scores to determine video segments of more exciting events, and indicates a recursive re-ranking procedure starting from step 116 and ending at step 112. In step 116, a second plurality of audio segments is generated by merging some of the first plurality of audio segments and by discarding some of the first plurality of audio segments according to a segmentation rule.

Figure 5:
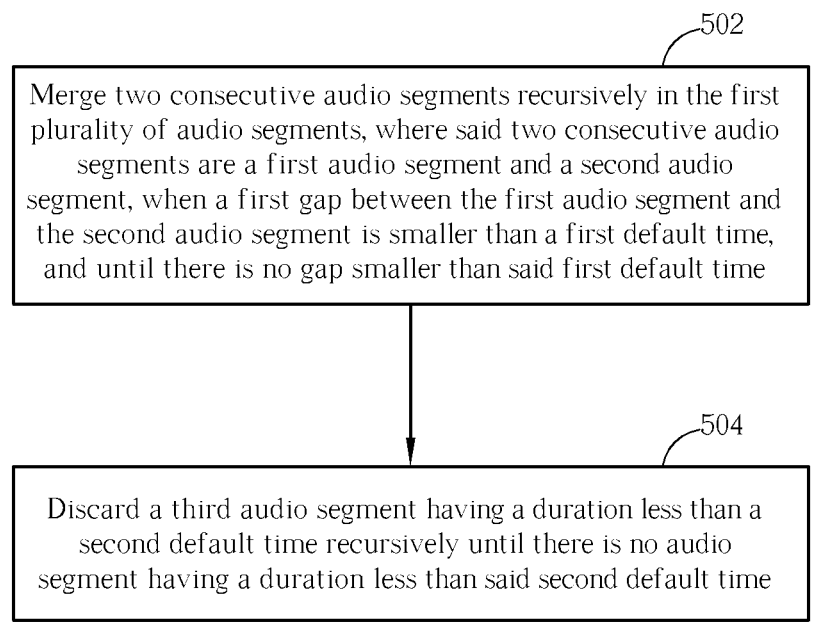
FIG. 5 is a flow chart illustrating how the segmentation rule works according to a preferred embodiment of the present invention.

Please refer to FIG. 5, which is a flow chart illustrating how the segmentation rule works according to a preferred embodiment of the present invention. As shown in FIG. 5, the segment rule utilized in step 116 is listed as follows:

Step 502: Merge two consecutive audio segments recursively in the first plurality of audio segments, where said two consecutive audio segments are a first audio segment and a second audio segment, when a first gap between the first audio segment and the second audio segment is smaller than a first default time, and until there is no gap smaller than said first default time.

Step 504: Discard a third audio segment having a duration less than a second default time recursively until there is no audio segment having a duration less than said second default time.

Take the abovementioned soccer game as an example. In a complete offensive play, it always takes at least 10 seconds to complete said offensive play, and therefore, setting the value of the first default time to 10 seconds helps record said complete offensive play soundly since both of the first audio segment and the second audio segment may be audio segments of the same play.

After completing step 502, isolated audio segments are discarded from the first plurality of audio segments in step 504 for ensuring trivial plays are excluded since trivial plays always take a smaller duration. In the soccer game, a trivial play takes no more than 3 seconds, and therefore, the second default time may be set to 3 seconds accordingly. After both of the steps 502 and 504 are completed, the second plurality of audio segments is generated.

It may be inducted that an amount of the first plurality of audio segments is larger than an amount of the second plurality of audio segments for reaching refinement in the re-ranking procedure. The second plurality of audio segments are then processed from step 104 to step 112. When the second plurality of audio segments comes to satisfying video segments, the process led to step 118 also. Else, a third plurality of audio segments is generated according to step 116 recursively.

Figure 6:
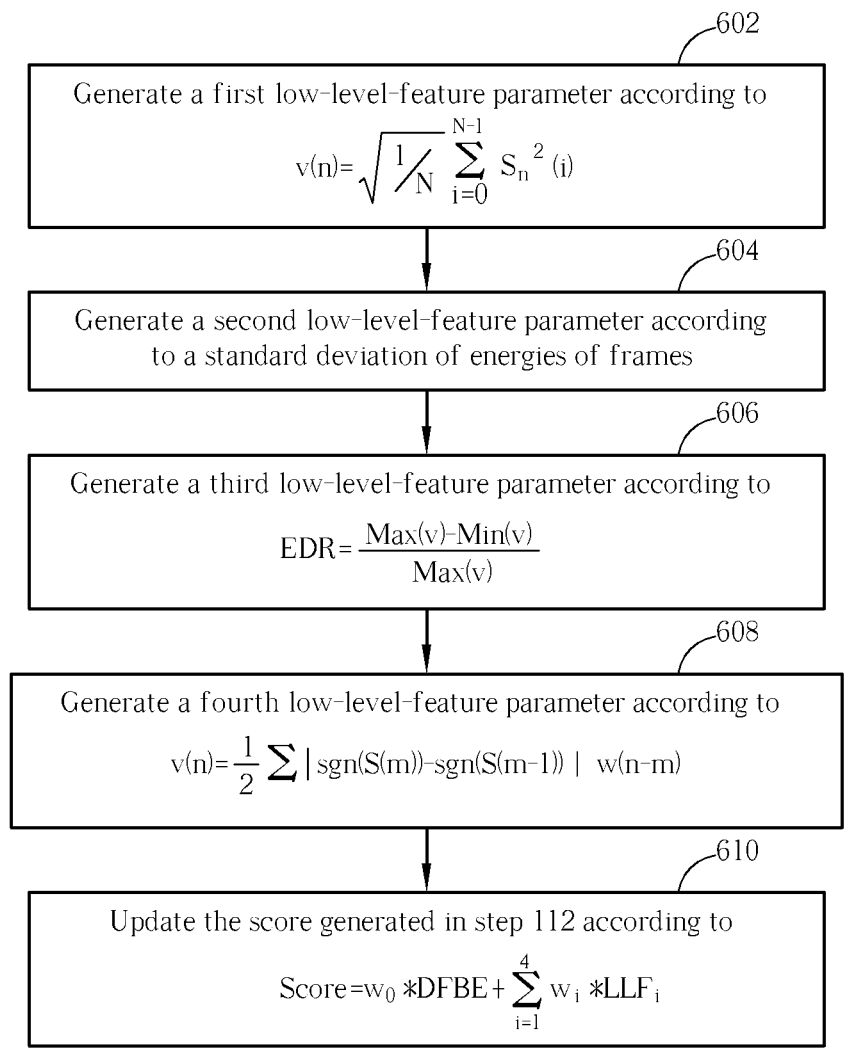
FIG. 6 is a flow chart illustrating how the low-level-feature parameters are generated and how a more precise score is determined with the generated low-level-feature parameters.

The enhancing method listed in step 120 provides better scores for picking up highlight-related video segments more precisely with a plurality of low-level-feature parameters generated from the first plurality of audio segments. Please refer to FIG. 6, which is a flow chart illustrating how the low-level-feature parameters are generated and how a more precise score is determined with the generated low-level-feature parameters. The steps shown in FIG. 6 are listed as follows:

Step 602: Generate a first low-level-feature parameter for each of the first plurality of audio segments according to an equation:

$$v(n) = \sqrt{\frac{1}{N} \sum_{i=0}^{N-1} S_n^2(i)}; \quad (4)$$

where $v(n)$ indicates the first low-level-feature parameter of an n-th audio segment of the first plurality of audio segments, $S_n(i)$ indicates an energy of the i-th audio frame of the n-th audio segment, and N indicates a total number of audio frames in the n-th audio segment.

Step 604: Generate a second low-level-feature parameter for each of the first plurality of audio segments according to a standard deviation of energies of the audio frames of each of the first plurality of audio segments.

Step 606: Generate a third low-level-feature parameter for the first plurality of audio segments according to each of the generated first low-level-feature parameters and to an equation:

$$EDR = \frac{\text{Max}(v) - \text{Min}(v)}{\text{Max}(v)}; \quad (5)$$

where EDR indicates the third low-level audio feature parameter, Max(v) indicates a maximum among all the generated first low-level-feature parameters, and Min(v) indicates a minimum among all the generated first low-level-feature parameter.

Step 608: Generate a fourth low-level-feature parameter for each of the first plurality of audio segments according to an equation:

$$z(n) = \frac{1}{2} \sum |\text{sgn}(S(m)) - \text{sgn}(S(m-1))| w(n-m); \quad (6)$$

where $z(n)$ indicates the fourth low-level-feature parameter of an n-th audio segment of the first plurality of audio segments, $S(m)$ indicates an energy of a m-th audio frame of said n-th audio segment, sgn($S(m)$) indicates a sign of the energy $S(m)$ so that $$\text{sgn}(S(m)) = \begin{cases} 1 & \text{if } S(m) \geq 0 \\ -1 & \text{if } S(m) < 0 \end{cases},$$

and $w(n-m)$ indicates a window size of the m-th audio frame.

Step 610: Update the score generated in step 112 with an equation:

$$\text{Score} = w_0 * DFBE + \sum_{i=1}^{4} w_i * LLF_i; \quad (7)$$

where Score indicates the updated score, DFBE indicates the dominant frequency band energy coefficient, $w_0$ indicates the weight of the dominant frequency band energy coefficient DFBE, $LLF_i$ indicates the i-th low-level-feature parameter from steps 602, 604, 606, and 608, and $w_i$ with i ranging from 1 to 4 indicates a weight of the i-th low-level audio feature parameter.

Note that in step 606, when an exciting event happens, cheers of audiences and commentators lead to a burst in volume and to an increase in a value of Max(v), therefore, a lower EDR is expected for indicating the exciting event accordingly.

In step 608, the fourth low-level audio feature $z(n)$ is helpful in distinguishing audios from pure speeches and speeches with certain background disturbances such as surrounding music and noises. Moreover, pure speeches indicate a lower $z(n)$, and therefore, a higher $z(n)$ is expected for indicating exciting events.

After scores of the first plurality of audio segments are updated in step 610, said updated scores are utilized for determining how valuable each of the first plurality of audio segments is for indicating highlight plays. Note that the abovementioned low-level audio feature parameters should not be limitations to the present invention.

Figure 7:
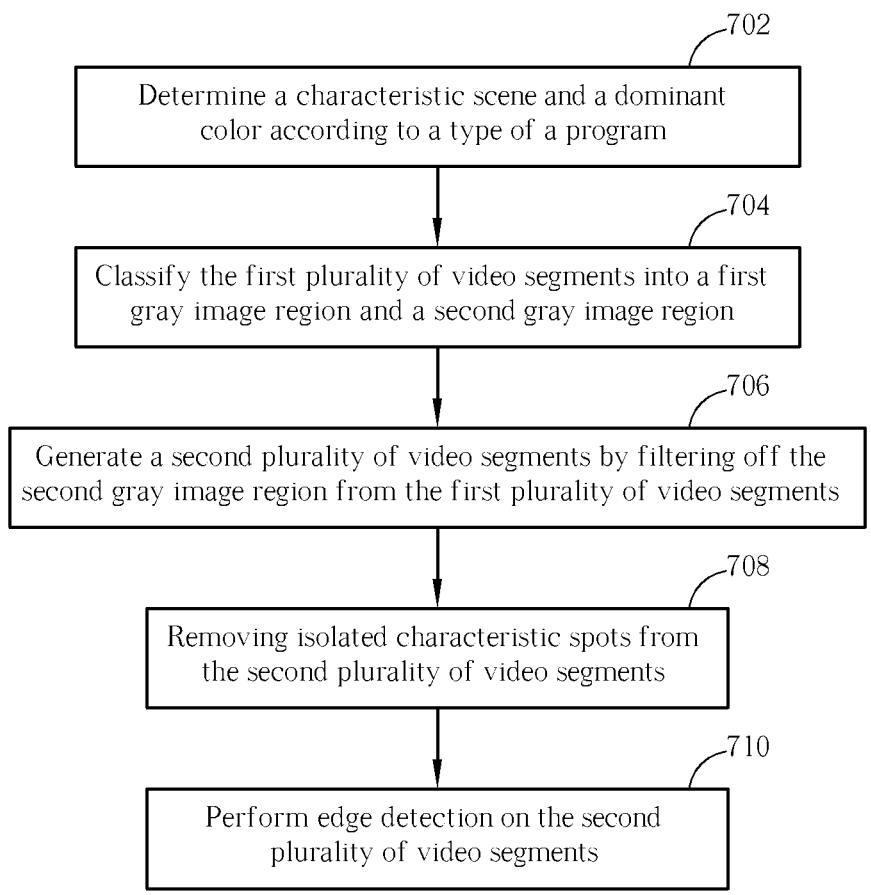
FIG. 7 is a flow chart illustrating how the enhancing method following certain video properties works.

The enhancing method listed in step 122 provides better scores as well as step 120 with certain video properties indicating highlight plays. In a preferred embodiment of the present invention based on sporting events, different sports have respective specific visual characteristics such as dominant colors. Moreover, with optional video feature choices, following audience's wills may choose various types of indexing. For example, in a soccer game, goals and effective shots appear with the gate pole; therefore, the video features of indicating said gate pole might be utilized for indicating specific highlight plays. Please refer to FIG. 7, which is a flow chart illustrating how the enhancing method following certain video properties works. As shown in FIG. 7, steps of the enhancing method following certain video properties are listed as follows:

Step 702: Determine a characteristic scene and a dominant color according to a type of a program.

Step 704: Classify the first plurality of video segments into a first gray image region and a second gray image region, where the first gray image region is dominated by the determined dominant color whereas the second gray image region is not.

Step 706: Generate a second plurality of video segments by filtering off the second gray image region from the first plurality of video segments.

Step 708: Removing isolated characteristic spots from the second plurality of video segments.

Step 710: Perform edge detection on the second plurality of video segments for detecting whether the characteristic scene exists in the second plurality of video segments.

Take sports for example, each sports has a standard sports field, therefore, most dominant colors of most sports are easy to be determined and detected. Testing a dominant color in video segments relating to the first plurality of audio segments helps remove trivial plays in said video segments. For example, a dominant color of a soccer field is green whereas a dominant color of a basketball field is yellow. With the enhancing method shown in FIG. 7, a highlight event may be determined when an extracted video segment has a gate view on a soccer field. That is, when an extracted video segment does not have a gate view, said extracted video segment may be discarded directly. For detecting a gate view, it is simplest of detecting video pattern of the gate pole with edge detection. A well-known algorithm denoted as Hough Transform may be utilized for the edge detection to detect the gate pole. Hough Transform is a standard tool in image analysis that allows recognition of global patterns in an image space by recognition of global patterns in an image space. The Hough Transform is most useful in detecting lines, circles, polynomials, and etc. A definition of the Hough Transform lies in:

$$H(\theta, \rho) = \int_{-\infty}^{\infty}\int_{-\infty}^{\infty} A(x, y)\delta(\rho - x\cos\theta - y\sin\theta)\,dx\,dy \qquad (8)$$

Figure 8:
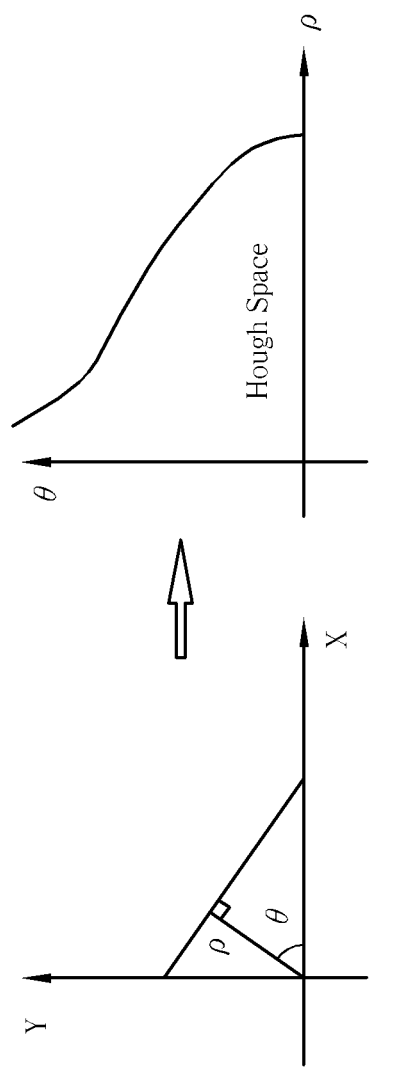
FIG. 8 illustrates a spatial domain transformation of the Hough Transform.

Please refer to FIG. 8, which illustrates a spatial domain transformation of the Hough Transform. In FIG. 8, x indicates a horizontal axis of a planar space, y indicates a vertical axis of said planar space, $\rho$ indicates a radius, and $\theta$ indicates an angle. The calculations of applying the Hough Transform are not going to be described further since the Hough Transform has been well-known for searching video patterns.

In order to have robust gate view detection, some preprocesses have to be performed on a first plurality of video segments of a video sequence of an original program to remove certain lateral effects generated by other objects having forms similar with the gate pole, for example, a soccer court side, auditoria chairs, broadcasting station logo, and etc. A first preprocess is to classify the intensity image of each of the first plurality of video segments to white area and non-white area since the gate pole must have a dominant color of white, and said non-white area is removed from said intensity image to generate a second plurality of video segments. A second preprocess called erosion is then performed on each of the second plurality of video segments to remove isolated characteristic spots from the second plurality of video segments. At last, the edge detection utilizing the Hough Transform is performed on the second plurality of video segments for searching the second plurality of video segments for characteristics of the gate pole. According to found characteristics of the gate pole within the second plurality of video segments, a third plurality of video segments is generated for indicating video segments having characteristics relating to the gate pole, i.e., relating to exciting events also.

Note that the enhancing method shown in FIG. 7 should not limited to a soccer game, and it indicates that the enhancing method shown in FIG. 7 may also be applied on other sports programs, and even programs other than sports programs.

Note that an order of performing steps 120 and 122 should not be limitations to the present invention, and also indicates that even merely performing one or none of both of steps 120 and 122, the uniform programming method shown in FIG. 1 still works.

A uniform program indexing method with simple, computational efficient, and robust audio features is provided in the present invention along with some enhancing methods. By focusing on certain frequencies in an audio sequence of a program, a computational complexity of the uniform program indexing method of the present invention is significantly decreased. With the aid of MFCC coefficients and a DFBE coefficient generated from said MFCC coefficients, audio patterns may be utilized for differentiating exciting events in the program from other unnecessary information. At last, scores corresponding to various audio segments are regarded as standards for picking up video segments in the program worthy of being chosen in a recorded highlight collection. Some low-level audio feature parameters are utilized for enhancing the precision of the grades, as well as some video segments having highlight-related visual characteristics. While chosen video segments corresponding to the generated scores are not satisfying enough, said chosen video segments may be processed in a re-ranking procedure for updating said generated scores to retrieve more reliable choosing standards. Therefore, the defect of having to watching a recorded program recording a complete game is relieved with the aid of the uniform program indexing method of the present invention by picking up video segments relating to highlight plays in said program worthy of being reviewed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A uniform program indexing method with a simple and robust audio feature comprising:

(a) detecting commercial advertisements in a received audio sequence, which comprises a plurality of audio frames, of a program;
(b) removing the detected commercial advertisements from the received audio sequence;
(c) sampling the received audio sequence, from which the detected commercial advertisements have been removed, with a specific frequency;
(d) generating 13 first Mel Frequency Cepstral Coefficients (MFCC) for each audio frame of the received audio sequence, the first 13 Mel Frequency Cepstral Coefficients comprising first dominant coefficients $C2$ and $C3$;
(e) retrieving the first dominant coefficients $C2$ and $C3$ from the first 13 Mel Frequency Cepstral Coefficients of each audio frame of the received audio sequence, wherein both first dominant coefficients $C2$ and $C3$ are normalized;
(f) generating a first dominant frequency band energy coefficient from the first dominant coefficients $C2$ and $C3$ for each audio frame of the received audio sequence;
(g) generating a plurality of first peak patterns from a plurality of first dominant frequency band energy coefficients in the received audio sequence with a low-pass filter, where a first peak pattern comprises a plurality of consecutive audio frames of the received audio sequence;
(h) determining a first threshold for transforming the plurality of first peak patterns into a first plurality of audio segments, where each of the first plurality of audio segments has more audio frames than a corresponding first peak pattern does;
(i) generating a first score for each of the first plurality of audio segments according to the first dominant frequency band energy coefficient generated from each first audio segment and a related weight;
(j) merging some of the first plurality of audio segments and discarding some of the first plurality of audio segments to generate a second plurality of audio segments according to a segmentation rule;
(k) generating 13 second Mel Frequency Cepstral Coefficients (MFCC) for each audio frame of the second plurality of audio segments, the 13 second Mel Frequency Cepstral Coefficients comprising second dominant coefficients $C2'$ and $C3'$;
(e1) retrieving the second dominant coefficients $C2'$ and $C3'$ from the 13 second Mel Frequency Cepstral Coefficients of each audio frame of the second plurality of audio segments, wherein both second dominant coefficients $C2'$ and $C3'$ are normalized;
(f1) generating a second dominant frequency band energy coefficient from the second dominant coefficients $C2'$ and $C3'$ for each audio frame of the second plurality of audio segments;
(g1) generating a plurality of second peak patterns from a plurality of second dominant frequency band energy coefficients in the second plurality of audio segments with the low-pass filter, where a second peak pattern comprises a plurality of consecutive audio frames of the second plurality of audio segments;
(h1) determining a second threshold for transforming the plurality of second peak patterns into a third plurality of audio segments, where each of the third plurality of audio segments has more audio frames than a corresponding second peak pattern does;
(i1) generating a second score for each of the third plurality of audio segments according to a second dominant frequency band energy coefficient generated from each audio segment of the second plurality of audio segments and a related weight; and
(j1) merging some of the third plurality of audio segments and discarding some of the third plurality of audio segments to generate a fourth plurality of audio segments according to the segmentation rule.

2. The method of claim 1 wherein the specific frequency is approximately 8 KHz.

3. The method of claim 1 wherein the step (f) further comprises:
(l) generating the first dominant frequency band energy coefficient by following an equation:

$$DFBE = 4*C2+C3;$$

where DFBE indicates the first dominant frequency band energy coefficient; and wherein the step (f1) further comprises:
(l1) generating the second dominant frequency band energy coefficient by following an equation:

$$DFBE = 4*C2'+C3';$$

where DFBE indicates the second dominant frequency band energy coefficient.

4. The method of claim 3 further comprising:
(m) normalizing the first dominant coefficients $C2$ and $C3$ with a first coefficient $C0$ of the generated plurality of first Mel Frequency Cepstral Coefficients before performing the step (e); and
(m1) normalizing the second dominant coefficients $C2'$ and $C3'$ with a second coefficient $C0'$ of the generated plurality of second Mel Frequency Cepstral Coefficients before performing the step (e1).

5. The method of claim 1 wherein the step (h) further comprises:
(n) generating a first mean and a first standard deviation of a plurality of first dominant frequency band energy coefficients of the plurality of first peak patterns; and
(n1) generating a second mean and a second standard deviation of a plurality of second dominant frequency band energy coefficients of the plurality of second peak patterns.

6. The method of claim 5 wherein the first threshold is determined by an equation:

$$Thresh1 = mean1 + x1*std1;$$

where Thresh1 indicates the first threshold, mean1 indicates the mean of the plurality of first dominant frequency band energy coefficients, and std1 indicates the standard deviation of the plurality of first dominant frequency band energy coefficients, and x1 is a variable;

wherein the second threshold is determined by an equation:

$$Thresh2 = mean2 + x2*std2;$$

where Thresh2 indicates the second threshold, mean2 indicates the mean of the plurality of second dominant frequency band energy coefficients, and std2 indicates the standard deviation of the plurality of a second dominant frequency band energy coefficients, and x2 is a variable.

7. The method of claim 6 wherein the value of x1 is 1, or x2 is 1.

8. The method of claim 1 further comprising:
(o) generating a first low-level-feature parameter for each of the first plurality of audio segments according to an equation:

$$v(n) = \sqrt{\frac{1}{N} \sum_{i=0}^{N-1} S_n^2(i)};$$

where v(n) indicates the first low-level-feature parameter of an n-th audio segment of the first plurality of audio segments, $S_n(i)$ indicates an energy of the i-th audio frame of the n-th audio segment of the first plurality of audio segments, and N indicates a total number of audio frames in the n-th audio segment of the first plurality of audio segments;

(p) generating a second low-level-feature parameter for each of the first plurality of audio segments according to a standard deviation of energies of the audio frames of each of the first plurality of audio segments;

(q) generating a third low-level-feature parameter for the first plurality of audio segments according to each of the generated first low-level-feature parameters and to an equation:

$$EDR = \frac{\text{Max}(v) - \text{Min}(v)}{\text{Max}(v)};$$

where EDR indicates the third low-level audio feature parameter, Max(v) indicates a maximum among all the generated first low-level-feature parameters, and Min(v) indicates a minimum among all the generated first low-level-feature parameter;

(r) generating a fourth low-level-feature parameter for each of the first plurality of audio segments according to an equation:

$$z(n) = \frac{1}{2} \sum |\text{sgn}(S(m)) - \text{sgn}(S(m-1))| w(n-m);$$

where z(n) indicates the fourth low-level-feature parameter of an n-th audio segment of the first plurality of audio segments, S(m) indicates an energy of an m-th audio frame of said n-th audio segment of the first plurality of audio segments, sgn(S(m)) indicates a sign of the energy S(m) so that $$\text{sgn}(S(m)) = \begin{cases} 1 & \text{if } S(m) \geq 0 \\ -1 & \text{if } S(m) < 0 \end{cases},$$

and w(n-m) indicates a window size of the m-th audio frame of the n-th audio segment of the first plurality of audio segments;

(s) updating the first score generated in step (i) with an equation:

$$\text{Score1} = w_0 * DFBE + \sum_{i=1}^{4} w_i * LLF_i;$$

where Score1 indicates the first score, DFBE indicates the first dominant frequency band energy coefficient, $w_o$ indicates the weight of the first dominant frequency band energy coefficient DFBE, $LLF_i$ indicates the i-th low-level-feature parameter in the steps (o), (p), (q), and (r), and $w_i$ with i ranging from 1 to 4 indicating a weight of the i-th low-level audio feature parameter;

(o1) generating a fifth low-level-feature parameter for each of the third plurality of audio segments according to an equation:

$$v'(n) = \sqrt{\frac{1}{N'} \sum_{i=0}^{N'-1} S_n'^2(i)};$$

where v'(n') indicates the fifth low-level-feature parameter of an n-th audio segment of the third plurality of audio segments, $S_n'(i)$ indicates an energy of the i-th audio frame of the n-th audio segment of the third plurality of audio segments, and N' indicates a total number of audio frames in the n-th audio segment of the third plurality of audio segments;

(p1) generating a sixth low-level-feature parameter for each of the third plurality of audio segments according to a standard deviation of energies of the audio frames of each of the third plurality of audio segments;

(q1) generating a seventh low-level-feature parameter for the third plurality of audio segments according to each of the generated fifth low-level-feature parameters and to an equation:

$$EDR' = \frac{\text{Max}(v') - \text{Min}(v')}{\text{Max}(v')};$$

where EDR' indicates the seventh low-level audio feature parameter, Max(v') indicates a maximum among all the generated fifth low-level-feature parameters, and Min(v') indicates a minimum among all the generated fifth low-level-feature parameters;

(r1) generating an eighth low-level-feature parameter for each of the third plurality of audio segments according to an equation:

$$z'(n) = \frac{1}{2} \sum |\text{sgn}(S'(m)) - \text{sgn}(S'(m-1))| w'(n-m);$$

where z'(n) indicates the eighth low-level-feature parameter of an n-th audio segment of the third plurality of audio segments, S'(m) indicates an energy of an m-th audio frame of the n-th audio segment of the third plurality of audio segments, sgn(S'(m)) indicates a sign of the energy S'(m) so that $$\text{sgn}(S'(m)) = \begin{cases} 1 & \text{if } S'(m) \geq 0 \\ -1 & \text{if } S'(m) < 0 \end{cases},$$

and w'(n-m) indicates a window size of the m-th audio frame of the n-th audio segment of the third plurality of audio segments;

(s1) updating the second score generated in step (i1) with an equation:

$$Score2 = w'_0 * DFBE' + \sum_{i=5}^{8} w'_i * LLF_i;$$

where Score2 indicates the updated score, DFBE' indicates the second dominant frequency band energy coefficient, $w_0'$ indicates the weight of the second dominant frequency band energy coefficient DFBE', $LLF_i$ indicates the i-th low-level-feature parameter in the steps (o1), (p1), (q1), and (r1), and $w_i'$ with i ranging from 5 to 8 indicates a weight of the i-th low-level audio feature parameter.

9. The method of claim 1 where the segmentation rule comprises:
 (t) merging a first audio segment and a second audio segment recursively in the first plurality of audio segments when a first gap between the first audio segment and the second audio segment is smaller than a first default time, the first audio segment and the second audio segment being consecutive audio segments;
 (u) discarding a third audio segment having a duration less than a second default time recursively after performing the step (t);
 (t1) merging a fourth audio segment and a fifth audio segment recursively in the third plurality of audio segments when a second gap between the fourth audio segment and the fifth audio segment is smaller than a third default time, the fourth audio segment and the fifth audio segment being consecutive audio segments; and
 (u1) discarding a sixth audio segment having a duration less than a fourth default time recursively after performing the step (t1).

10. The method of claim 1 further comprising:
 retrieving a first plurality of video segments of a video sequence of the program according to the generated scores.

11. The method of claim 10 further comprising:
 (v1) determining a characteristic scene and a dominant color according to a type of the program;
 (v2) classifying the first plurality of video segments into a first gray image region and a second gray image region, where the first gray image region is dominated by the determined dominant color whereas the second gray image region is not;
 (v3) generating a second plurality of video segments by filtering off the second gray image region from the first plurality of video segments;
 (v4) removing isolated characteristic spots from the second plurality of video segments; and
 (v5) performing edge detection on the second plurality of video segments for detecting whether the characteristic scene exists in the second plurality of video segments.

12. The method of claim 11 wherein the step (v5) is performed with a Hough transform process.

13. The method of claim 11 further comprising:
 generating a third plurality of video segments according to the result of step (v5).

14. The method of claim 11 wherein the program is a soccer program, the dominant color is white, and the characteristic scene is a gate view of the soccer program.

15. An enhancing method of supporting uniform program indexing with a plurality of low-level features, the method comprising:

(a) generating a first low-level-feature parameter for each of a first plurality of audio segments having a plurality of audio frames according to an equation:

$$v(n) = \sqrt{\frac{1}{N} \sum_{i=0}^{N-1} S_n^2(i)};$$

where v(n) indicates the first low-level-feature parameter of an n-th audio segment of the first plurality of audio segments, $S_n(i)$ indicates an energy of an i-th audio frame of the n-th audio segment, and N indicates a total number of audio frames in the n-th audio segment;

(b) generating a second low-level-feature parameter for each of the first plurality of audio segments according to a standard deviation of energies of the audio frames of each of the first plurality of audio segments;

(c) generating a third low-level-feature parameter for the first plurality of audio segments according to each of the generated first low-level-feature parameters and to an equation:

$$EDR = \frac{\text{Max}(v) - \text{Min}(v)}{\text{Max}(v)};$$

where EDR indicates the third low-level audio feature parameter, Max(v) indicates a maximum among all the generated first low-level-feature parameters, and Min(v) indicates a minimum among all the generated first low-level-feature parameter;

(d) generating a fourth low-level-feature parameter for each of the first plurality of audio segments according to an equation:

$$z(n) = \frac{1}{2} \sum |\text{sgn}(S(m)) - \text{sgn}(S(m-1))| w(n-m);$$

where z(n) indicates the fourth low-level-feature parameter of an n-th audio segment of the first plurality of audio segments, S(m) indicates an energy of a m-th audio frame of said n-th audio segment, sgn(S(m)) indicates a sign of the energy S(m) so that $$\text{sgn}(S(m)) = \begin{cases} 1 & \text{if } S(m) \geq 0 \\ -1 & \text{if } S(m) < 0 \end{cases},$$

and w(n-m) indicates a window size of the m-th audio frame;

(s) generating a score for each of the first plurality of audio segments with an equation:

$$Score = w_0 * DFBE + \sum_{i=1}^{4} w_i * LLF_i;$$

where Score indicates the generated score, DFBE indicates a dominant frequency band energy coefficient of an audio segment, $w_0$ indicates the weight of the dominant frequency band energy coefficient DFBE, $LLF_i$ indicates the i-th low-level audio feature parameter from the steps (a), (b), (c), or (d), and $w_i$ with i ranging from 1 to 4 indicating a weight of the i-th low-level-feature parameter; and (p) a processor retrieving a plurality of video segments of a video sequence of a program having an audio sequence, from where the first plurality of audio segments is retrieved, according to the generated score of each of the first plurality of audio segments.

16. An enhancing method of supporting uniform program indexing with a dominant frequency band energy coefficient comprising:

(a) generating 13 of Mel Frequency Cepstral Coefficients (MFCC) for each audio frame of an audio sequence of a program, the 13 Mel Frequency Cepstral Coefficients comprising dominant coefficients C2 and C3;

(b) retrieving the dominant coefficients C2 and C3 from the generated plurality of Mel Frequency Cepstral Coefficients of each audio frame, wherein both retrieved dominant coefficients C2 and C3 are normalized;

(c) generating a dominant frequency band energy coefficient from the retrieved dominant coefficients C2 and C3 for each audio frame by following an equation:

$$DFBE = 4*C2 + C3;$$

where DFBE indicates the generated dominant frequency band energy coefficient;

(e) generating a plurality of peak patterns from the dominant frequency band energy coefficient of each audio frame of the audio sequence with a low-pass filter, where each of the plurality of peak patterns comprises a plurality of consecutive audio frames of the audio sequence;

(f) determining a threshold for transforming the plurality of peak patterns into a first plurality of audio segments, where each of the first plurality of audio segments has more audio frames than a corresponding peak pattern does;

(g) generating a score for each of the first plurality of audio segments according to a dominant frequency band energy coefficient generated from each audio segment and a related weight; and (h) retrieving a first plurality of video segments of a video sequence of the program according to the generated scores.

17. The method of claim 16 further comprising:

(d) normalizing the dominant coefficients C2 and C3 with a coefficient C0 of the generated plurality of Mel Frequency Cepstral Coefficients before performing the step (c).

* * * * *